(12) United States Patent
Vengerov et al.

(10) Patent No.: US 10,353,897 B2
(45) Date of Patent: Jul. 16, 2019

(54) ONE-PASS JOIN SIZE ESTIMATION WITH CORRELATED SAMPLING

(71) Applicant: Oracle International Corporation, Redwood Shores, CA (US)

(72) Inventors: David Vengerov, San Jose, CA (US); Mohamed Zait, San Jose, CA (US); Sunil P. Chakkappen, Foster City, CA (US); Andre Menck, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 356 days.

(21) Appl. No.: 14/753,179

(22) Filed: Jun. 29, 2015

(65) Prior Publication Data

US 2016/0378829 A1 Dec. 29, 2016

(51) Int. Cl.
*G06F 16/2453* (2019.01)
(52) U.S. Cl.
CPC .............................. *G06F 16/24545* (2019.01)
(58) Field of Classification Search
CPC ..................... G06F 17/30649; G06F 17/30469
See application file for complete search history.

(56) References Cited

U.S. PATENT DOCUMENTS

| | | | |
|---|---|---|---|
| 6,477,534 B1 * | 11/2002 | Acharya | G06F 17/30457 |
| 2006/0143170 A1 * | 6/2006 | Ganguly | G06F 17/30516 |
| 2010/0191720 A1 * | 7/2010 | Al-Omari | G06F 17/30463 |
| | | | 707/718 |
| 2012/0185437 A1 * | 7/2012 | Pavlov | G06F 17/30094 |
| | | | 707/652 |
| 2015/0019529 A1 * | 1/2015 | Veldhuizen | G06F 17/30469 |
| | | | 707/719 |

OTHER PUBLICATIONS

Noga Alon et al., "Tracking Join and Self-Join Sizes in Limited Storage", In Proceedings of the eighteenth ACM SIGMOD-SIGACT-SIGART symposium on Principles of database systems (PODS '99), ACM Press, New York, NY, 1999, 10-20.

(Continued)

*Primary Examiner* — Syling Yen
*Assistant Examiner* — Tony Wu
(74) *Attorney, Agent, or Firm* — Potomac Law Group, PLLC

(57) ABSTRACT

A system performs database management. The system receives a request for a query of a plurality of tables under a join condition on an attribute and determines a uniform mapping that maps a domain of the attribute into a set of numbers, where the domain of the attribute includes all attribute values taken by the attribute in the tables. Then, for a row in a table, the system includes the row into a synopsis of the table if the row includes an attribute value that is mapped by the uniform mapping to a number less than an inclusion probability associated with the table. The system obtains a plurality of synopsis for the tables by repeating the including for all rows in the table and for all tables, and determines, based on the plurality of synopsis, an estimate join size of the tables under the join condition.

20 Claims, 2 Drawing Sheets

(56) References Cited

OTHER PUBLICATIONS

Kaushik Chakrabarti et al., "Approximate Query Processing Using Wavelets", In Proceedings of the 26th International Conference on Very Large Data Bases (VLDB '00), Morgan Kaufmann Publishers Inc. San Francisco, CA, 2000, 111-122.

Alin Dobra et al., "Processing Complex Aggregate Queries over Data Streams", In Proceedings of the 2002 ACM SIGMOD International Conference on Management of Data. ACM Press, New York, NY, 2002, 61-72.

Cristian Estan et al., "End-biased Samples for Join Cardinality Estimation", In Proceeding of the 22nd International Conference on Data Engineering (ICDE '06). IEEE Computer Society Washington, DC, 2006.

Sumit Ganguly et al., "Processing Data-Stream Join Aggregates Using Skimmed Sketches", In Proceedings of International Conference on Extending Database Technology (EDBT' 2004). Lecture Notes in Computer Science, vol. 2992. 569-586.

Nuno Homem et al., "Finding top-k elements in data streams", Information Sciences, 180, 24, (2010).

Daniel Lemire et al., "Strongly universal string hashing is fast", Computer Journal, 57, 11, (2014).

Florin Rusu et al., "Sketches for size of join estimation", ACM Transactions on Database Systems, 33, 3 (2008).

Florin Rusu et al., "Pseudo-Random Number Generation for Sketch-Based Estimations", ACM Transactions on Database Systems, 32, 2, (2007).

Feng Yu et al., "CS2: A New Database Synopsis for Query Estimation", In Proceedings of the 2013 ACM SIGMOD International Conference on Management of Data (SIGMOD '13), ACM Press, New York, NY, 2013, 469-480.

Graham Cormode et al., "Sketching Streams Through the Net: Distributed Approximate Query Tracking", Proceedings of the 31st VLDB Conference, Trondheim, Norway, 2005, pp. 13-24.

\* cited by examiner

ONE-PASS JOIN SIZE ESTIMATION WITH CORRELATED SAMPLING

FIELD

One embodiment is directed generally to a database system, and in particular, to join size estimation in a database system.

BACKGROUND INFORMATION

As database systems continue to grow in size and complexity, it becomes ever more crucial to provide efficient and fast database query services. To that end, some database systems implement query optimization functionality to determine the most efficient execution strategy for each query. The execution strategy may be chosen based on statistical information on data. Alternatively or additionally, it may be chosen based on structural and/or functional features of a database system.

Generally, a database includes multiple tables, each holding various records, and each record including a number of fields of information. A common type of query on multiple tables is a "join" query. In a join query, multiple tables are searched to find those tuples of records that match the same criteria. One type of join query is an equijoin query where multiple tables are searched to find those tuples of records in which the specified fields are equal. For example, a first table in a database may include records of individuals, where each record includes fields holding the name of a person and his/her movie interests. The same database may hold a second table of records of individuals along with their favorite sports. One equijoin query on these two tables may aim to find those pairs of records of a same person that indicate both movie interests and favorite sports of a person.

Generally, the computational resources required for executing an equijoin query grows with the size of the tables involved. This becomes a significant concern for large tables. In order to reduce the execution complexity of database queries, the output size (e.g., cardinality) of a query may be estimated prior to determining whether to proceed with the query or not. Query size estimation may be performed by sampling each table and running the query on the samples in place of the tables.

SUMMARY

One embodiment is a system that performs database management. The system receives a request for a query of a plurality of tables under a join condition on an attribute and determines a uniform mapping that maps a domain of the attribute into a set of numbers, where the domain of the attribute includes all attribute values taken by the attribute in the plurality of tables. Then, for a row in a table of the plurality of tables, the system includes the row into a synopsis of the table if the row includes an attribute value that is mapped by the uniform mapping to a number less than an inclusion probability associated with the table. The system obtains a plurality of synopsis for the plurality of tables by repeating the including for all rows in the table and for all tables in the plurality of tables, and determines, based on the plurality of synopsis, an estimate join size of the plurality of tables under the join condition.

DETAILED DESCRIPTION

One embodiment provides a one-pass correlated sampling algorithm for estimating the size of the join of multiple database tables. One embodiment constructs a small space synopsis for each table to provide a quick estimate of the join size of the tables subject to dynamically specified predicate filter conditions. In one embodiment, the synopsis of a table is constructed by randomly selecting a subset of the rows of the table for inclusion in the synopsis, and random variables that are used to make inclusion decisions are shared among the tables. The filter conditions may be specified over multiple columns (e.g., attributes) of each table. Embodiments determine such join size by making a single pass over the data and are thus suitable for streaming data and for very large database tables.

Figure 1:
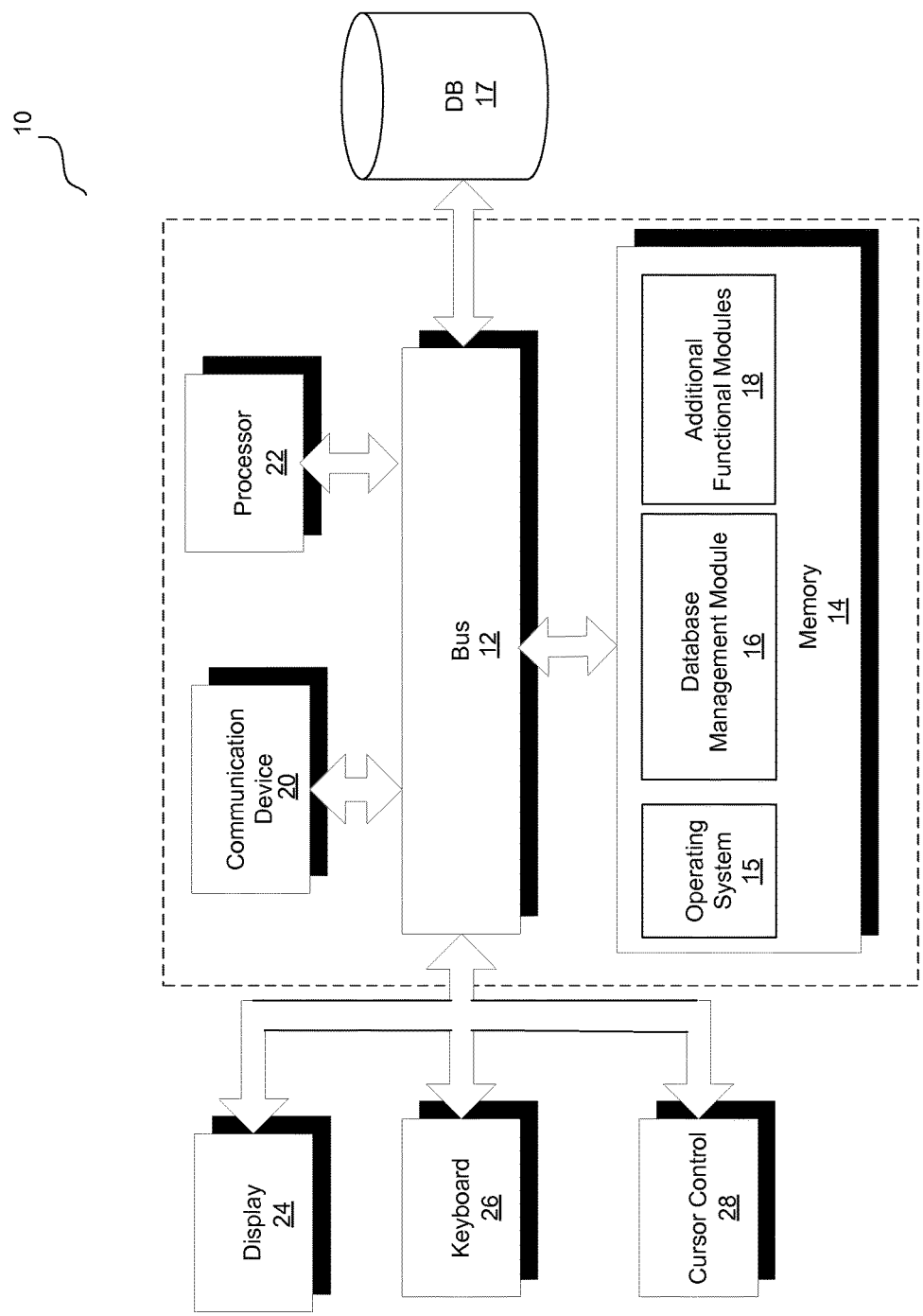
FIG. 1 is a block diagram of a computer server/system in accordance with an embodiment of the present invention.

FIG. 1 is a block diagram of a computer server/system (i.e., system 10) in accordance with an embodiment of the present invention. Although shown as a single system, the functionality of system 10 can be implemented as a distributed system. Further, the functionality disclosed herein can be implemented on separate servers or devices that may be coupled together over a network. Further, one or more components of system 10 may not be included. For example, for the functionality of a database management system, system 10 may be a server that in general has no need for a display 24 or one or more other components shown in FIG. 1.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable medium. System 10 further includes a communication device 20, such as a network interface card, to provide access to a network. Therefore, a user may interface with system 10 directly, or remotely through a network, or any other method.

Computer readable medium may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 may further be coupled via bus 12 to a display 24, such as a Liquid Crystal Display ("LCD"). A keyboard 26 and a cursor control device 28, such as a computer mouse, may further be coupled to bus 12 to enable a user to interface with system 10 on an as needed basis.

In one embodiment, memory 14 stores software modules that provide functionality when executed by processor 22. The modules include an operating system 15 that provides operating system functionality for system 10. The modules further include a database management module 16 for providing database management, and all other functionality disclosed herein. System 10 can be part of a larger system, such as added functionality to the Oracle Database Optimizer from Oracle Corp., or any database management system. Therefore, system 10 can include one or more additional functional modules 18 to include the additional functionality. A database 17 is coupled to bus 12 to provide centralized storage for database management module 16 and additional functional modules 18.

Figure 2:
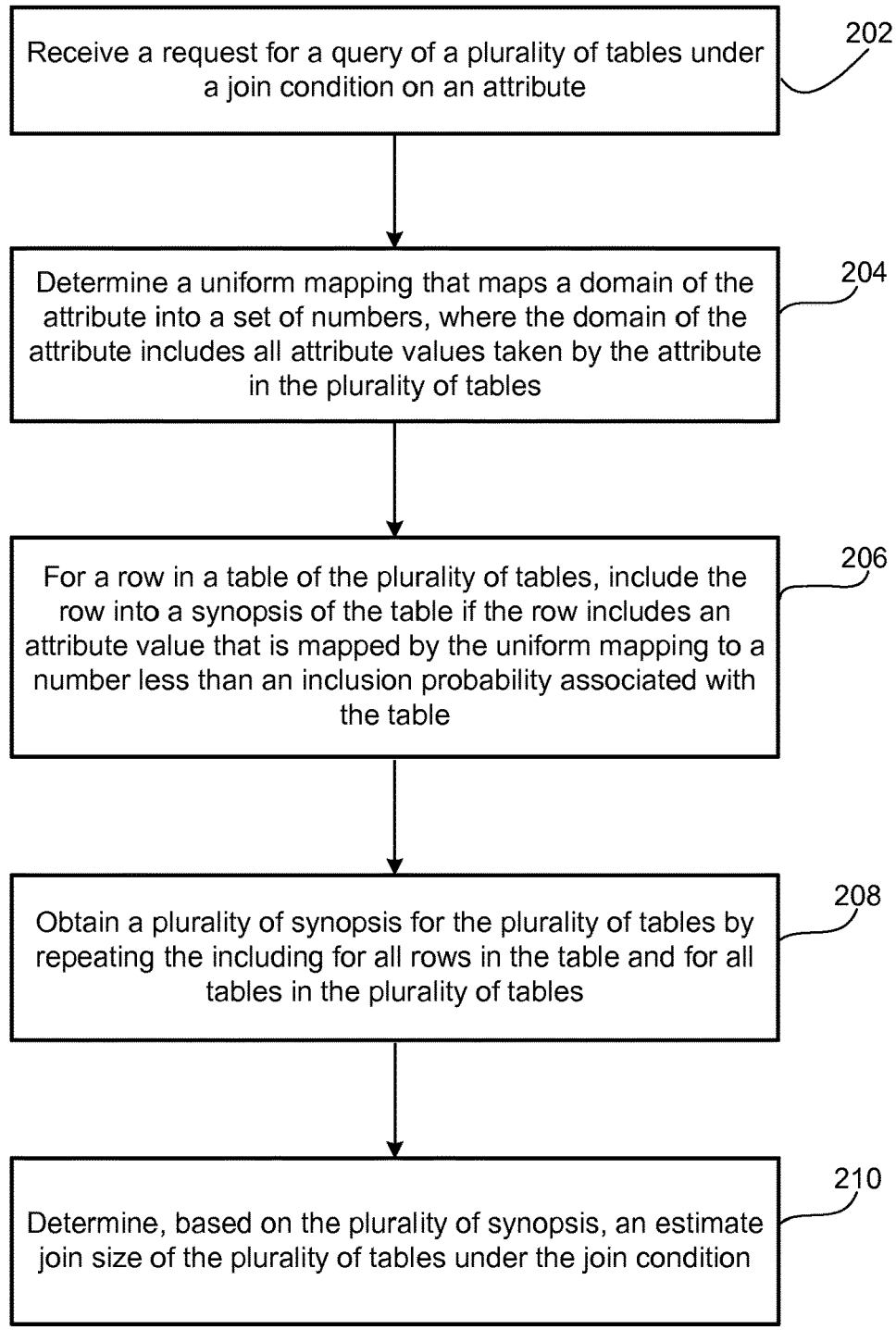
FIG. 2 is a flow diagram of the operation of the database management module of FIG. 1 when performing database management in accordance with embodiments of the present invention.

In one embodiment, database management module 16 and/or additional functional modules 18 may include a receiving module that receives a request for a query of a plurality of tables under a join condition on an attribute; a determining module that determines a uniform mapping that maps a domain of the attribute into a set of numbers, where the domain of the attribute includes all attribute values taken by the attribute in the plurality of tables; an including module that, for a row in a table of the plurality of tables, includes the row into a synopsis of the table if the row includes an attribute value that is mapped by the uniform mapping to a number less than an inclusion probability associated with the table; an obtaining module that obtains a plurality of synopsis for the plurality of tables by repeating the including for all rows in the table and for all tables in the plurality of tables; and an estimating module that determines, based on the plurality of synopsis, an estimate join size of the plurality of tables under the join condition, as will be described herein with reference to FIG. 2.

Generally, with known systems, database query optimization is performed based on a query cost model and a query cardinality model. The query cost model is used to determine the resource cost (e.g., required input/output ("I/O") resources, CPU utilization, network resources, etc.) for an execution plan of a query. Query cardinality refers to the number of rows returned in a query execution plan. While the accuracy of both the query cardinality model and the query cost model affect the performance of database query optimization, the effect of errors in the query cardinality model is more substantial than that of the query cost model. However, known systems fail to provide accurate join size estimation in the query cardinality model, especially when predicate filters are used.

Generally, when the join size of multiple tables needs to be quickly estimated using a small memory footprint, a small synopsis of each table is constructed and used to estimate the join size of the actual tables. For large tables (e.g., tables that hold many terabytes or petabytes of data), it is resource intensive to use a multi-pass method for constructing a synopsis, hence the synopsis of a large table may need to be constructed in one pass. One-pass synopsis construction is also necessary when the input data to joins includes data streams. This may happen, for example, in a network operations center of a large internet service provider ("ISP") that monitors hundreds or thousands of events and network elements (e.g., routers, links, etc.). In this case, the synopsis needs to be constructed while the data is streaming so that it could be used at any time to determine the latest estimate of the join size of two streams.

While some known systems provide join size estimation based on small-space synopses, they do not describe one-pass join size estimation under dynamically specified filter conditions (e.g., filters that are specified in the query after the synopses have been constructed). Some known systems use Bernoulli sampling for join size estimation. For example, in a two table scenario, these known systems form independent Bernoulli samples $S_1$ and $S_2$ (with sampling probabilities $p_1$ and $p_2$) of tables $T_1$ and $T_2$ that are being joined, compute the join size J' of the two samples, and then scale it appropriately. However, in these systems, the probability of an infrequent join attribute value being included in both samples is very small when individual sampling probabilities $p_i$ are small. Therefore, if such infrequent values dominate the two tables, the variance of the join size estimate will be very high.

Some known systems use the end-biased sampling algorithm to address the aforementioned shortcoming of the Bernoulli sampling algorithm. The end-biased sampling algorithm has a tunable parameter $K_i$ for each table $T_i$ to control the trade-off between estimation accuracy and sample size. Some known systems perform correlated sampling (i.e., sampling using a common hash function) of the tables to be joined, as a part of the end-biased sampling algorithm. However, end-biased sampling requires prior knowledge of the frequencies of the join attribute values, making it unsuitable for the streaming data or for very large datasets which require single-pass processing. Also, the tunable parameter $K_i$ needs to be set through manual experimentation.

Some known systems provide join size estimation based on the correlated sample synopsis ("CS2") algorithm. CS2 estimates the join size of multiple tables subject to arbitrary predicate filter conditions. For example, for two tables to be joined, CS2 samples a tuple from the first table, finds all tuples from the second table that join with it and satisfy all filter conditions, includes them into the synopsis, and repeats this process until the memory budget for the synopsis size has been reached. However, CS2 requires multiple passes through the second table. Another variation of CS2 firsts takes a multi-tuple sample of the first table and then finds all tuples in the second table that join with at least one tuple from the sample. The drawback of this variation is that it may consume an unpredictable amount of memory.

Some known systems use sketch-based methods for join size estimation. However, these known systems do not consider any filter conditions. Some known systems approximate query processing using nonstandard multi-dimensional wavelet decomposition. After a synopsis of each table is constructed, it is used to estimate the cardinality of complex structured query language ("SQL") queries, such as joins subject to dynamically specified filter conditions. However, these systems require access to old data and therefore cannot be used for streamed data. Further, when the data is very sparse in its multi-dimensional representation, the largest magnitude wavelet coefficients (which are usually kept during synopsis construction while the other smaller coefficients are discarded to save space) are the highest-resolution coefficients, and there are almost as many of them as in the original data points. Therefore, only a minimal data compression is achieved when accurate cardinality estimates are derived for sparse data.

In contrast to the known systems, embodiments of the present invention provide a one-pass correlated sampling algorithm for estimating the join size of multiple database tables subject to dynamic filter conditions. One embodiment builds a small space synopsis (or sample) of each table by conditionally including each row from that table into the synopsis, where the conditional inclusion happens with an inclusion probability, and where the random variables used to make inclusion decisions are shared among the tables. After the samples of all tables have been built, the join size is estimated in an unbiased manner under dynamically specified filter conditions and without modifying the samples. The join size may be estimated by selecting those rows from each sample that satisfy the filter conditions for the corresponding table.

Unlike the known end-biased algorithm, embodiments provide a correlated sampling algorithm that does not require apriori knowledge of the frequencies of the join attribute values and does not use a manually tuned parameter. Thus, embodiments are suitable for streaming data and very large databases where one-pass processing is required. Embodiments may also be used for join size estimation with multiple tables and complex join conditions.

One embodiment implements a correlated sampling algorithm to find the estimate cardinality of the equality join of two tables under a single equijoin condition that the first attribute in the first table $T_1$ needs to be equal to the first attribute in the second table $T_2$, i.e., $u_{11}=u_{21}$. In this embodiment, for $n_1$ denoting the desired sample size for table $T_1$ and for $n_2$ denoting the desired sample size for table $T_2$, the sample sizes can be achieved, in expectation, if each row from table $T_i$ is selected with probability $p_i=n_i/|T_i|$ where $|T_i|$ denotes the size of table $T_i$. An example of a two table scenario is joining a sales table with a customer data table along a customer identifier ("ID") column. The selection of rows is performed by first selecting a hash function h( ) that uniformly maps the domain of the join attribute into the range [0,1]. A row r in table $T_i$ in which the join attribute $u_{i1}$ takes the value v is then included in the sample $S_i$ if $h(v)<p_i$. Alternatively, this process can be viewed as generating, for each attribute value v, a uniform random number between 0 and 1, with the seed of the random generator being set to v. If the generated random number is less than $p_i$, then row r is included in the sample $S_i$.

Further, let $p_{min}=\min(p_1, p_2)$. In one embodiment, the correlated sampling algorithm first computes the join size J' of samples $S_1$ and $S_2$ and then divides the result by $p_{min}$ in order to arrive at the final estimate $\hat{J}=J'/p_{min}$ of the join size of $T_1$ and $T_2$. In this embodiment, rows where the join attribute ($u_{i1}$ or $u_{i2}$) is equal to v appear in both samples if and only if $h(v)<p_{min}$, which happens with probability $p_{min}$ since h(v) is a uniform random variable. Then, a value v that appears in both tables is expected to contribute $p_{min}F_1(v)F_2(v)$ to the expected join size computed over the samples $S_1$ and $S_2$, and the expected size of this join is equal to $\Sigma_v p_{min}F_1(v)F_2(v)$. Thus, if the join size of samples $S_1$ and $S_2$ is divided by $p_{min}$, in expectation the result is equal to $\Sigma_v F_1(v)F_2(v)$, which is the true join size of $T_1$ and $T_2$. Accordingly, $\hat{J}$ is an unbiased estimate of the join size.

In the aforementioned embodiment, the join size estimate is a summation over all join attribute values v of Bernoulli random variables (for which $P(1)=p_{min}$, $P(0)=1-p_{min}$), each of which is scaled by $F_1(v)F_2(v)/p_{min}$. The variance of each such random variable is equal to $p_{min}(1-p_{min})(F_1(v)F_2(v)/p_{min})^2$ and they are independent. Thus, the variance of the final estimate $\hat{J}$ is given by $$\mathrm{Var}(\hat{J}) = \left(\frac{1}{p_{min}} - 1\right)\Sigma_v F_1^2(v)F_2^2(v)$$

where the sum is taken over join attribute values that occur in both tables.

As shown above, join attribute values are sampled in a correlated fashion and their contribution to the variance of the estimator scales as $$\frac{1}{\min(p_1, p_2)}.$$

Accordingly, correlated sampling results in smaller join size estimation variance when the tables are dominated by infrequent values as compared to when the join attribute values occur frequently in both tables. Thus, in one embodiment, such values are detected ahead of time, their frequencies are accurately estimated, and their contribution to the join size is computed directly using the estimated frequencies, as disclosed, for example, in Estan et al. "End-biased Samples for Join Cardinality Estimation," In Proceeding of the 22nd International Conference on Data Engineering (ICDE '06). IEEE Computer Society Washington, D.C., 2006; and Ganguly et al. "Processing Data-Stream Join Aggregates Using Skimmed Sketches," In Proceedings of International Conference on Extending Database Technology (EDBT' 2004). Lecture Notes in Computer Science, Volume 2992. 569-586.

In one embodiment, the filtered space-saving ("FSS") algorithm may be used for detecting the most frequent values in a data stream, as disclosed, for example, in Homem et al. "Finding top-k elements in data streams," Information Sciences, 180, 24, (2010). This algorithm makes a single pass over the data (performing order one operations for each tuple) and can thus be run in parallel with the sampling phase of the correlated sampling algorithm. The FSS algorithm creates a list of suggested most frequent values, and for each value gives its estimated frequency and the maximum estimation error. In one embodiment, the values that appear in the candidate lists for both $T_1$ and $T_2$ and have the maximum percentage frequency estimation error less than a certain threshold are considered to be "frequent values" and their contribution to the join size of $T_1$ and $T_2$ is computed by a direct multiplication of their estimated frequencies. This may also be performed for highly skewed data distributions.

In one embodiment, by choosing a small percentage error threshold when implementing the FSS algorithm, a small bias is incurred in the join size estimate since the FSS algorithm is configured to overestimate the frequencies. However, a large variance is not incurred since the most frequent values are absent from the summation in the variance equation. The remaining "non-frequent" values in the samples $S_1$ and $S_2$ can then be joined together, and if the resulting join size is divided by $p_{min}$, an unbiased contribution of all non-frequent values to the join size of $T_1$ and $T_2$ is obtained, since the expected contribution to the join size of $S_1$ and $S_2$ of each "non-frequent value" v that appears in both tables is equal to $p_{min}F_1(v)F_2(v)$.

In one embodiment, the correlated sampling algorithm is used to find the equality join of two tables under dynamically specified filter conditions. A dynamically specified filter condition $c_i$ is a filter condition that is specified for table $T_i$ after the samples have been created. In this embodiment, given that each join attribute value v appears in both samples with probability $p_{min}$, if selected for inclusion, it contributes $F_1^{(c_1)}(v)F_2^{(c_2)}(v)$ to the join size computed over samples $S_1$ and $S_2$. Accordingly, the expected contribution of v to this join size is $p_{min}F_1^{(c_1)}(v)F_2^{(c_2)}(v)$, and the expected overall join size is $\Sigma_v p_{min}F_1^{(c_1)}(v)F_2^{(c_2)}(v)$, which when divided by $p_{min}$, gives the join size subject to the specified predicate filter condition, i.e., the join size when joining only those rows in tables $T_i$ that satisfy the predicate filter condition $c_i$. The corresponding variance can be derived as in the embodiments with no filer conditions, but with $F_i(v)$ replaced by $F_i^{(c_i)}(v)$. Accordingly, the variance of the estimate is reduced as the filter conditions become stricter or more selective (i.e., cover a larger data range), but the true join size also decreases.

In one embodiment, the correlated sampling algorithm randomly chooses a hash function h( ) from a strongly universal family of hash functions that map the domain of the join attribute into [0,1). Such a hash function usually already exists in the database. Alternatively, there are known algorithms for constructing such a hash function, as disclosed, for example, in Lemire et al. "Strongly universal string hashing is fast," Computer Journal, 57, 11, (2014), and the references therein. One well-known and robust hash function is h(v)=((av+b) mod p)/p, where a, b∈[1, p) are randomly chosen integers and p is a large prime number. Then, a first table $T_1$ is scanned to observe the value v taken by the join attribute in each row, and that row is selected into sample $S_1$ if h(v)<p (where p can be set to 0.01 or something smaller if a smaller sample is desired). The same is also performed for a second table $T_2$ to construct sample $S_2$. Finally, the join size of $T_1$ and $T_2$ is estimated as $Ĵ=(S_1 ⋈ S_2)/p$ where ⋈ denotes the natural join function.

One embodiment provides correlated sampling for multiple tables and complex join conditions. In this embodiment, for two tables $T_i$ and $T_j$ and corresponding join attributes $u_{ik}$, $u_{j1}$, the notation $u_{ik}~u_{j1}$ indicates that the join condition $u_{ik}=u_{j1}$ applies. For any attribute $u_{ik}$, the notation $\psi(u_{ik})$ denotes its equivalence class under the relation ~, that is, $\psi(u_{ik})$ includes all other attributes that have to be equal to $u_{ik}$ under the join query. Since there are a finite number of join attributes and each of them can belong to only one equivalence class, there is a finite number of equivalence classes for any join query, denoted herein as $\Psi_1, \ldots, \Psi_K$.

In one embodiment, for example, table $T_1$ has join attributes $u_{11}$ and $u_{12}$, table $T_2$ has a join attribute $u_{21}$, and table $T_3$ has join attributes $u_{31}$ and $u_{32}$. The set of join conditions $\{u_{11}=u_{31}, u_{12}=u_{32}, u_{11}=u_{21}\}$ corresponds to two equivalence classes: $\Psi_1$ in which $u_{11}~u_{21}~u_{31}$ and $\Psi_2$ in which $u_{12}~u_{32}$. These equivalence classes may, for example, correspond to strings of connected edges on a join graph. For each equivalence class $\Psi_k$, a uniform hash function $h_k$ can be defined from the attribute domain to [0,1]. Each hash function $h_k$ may be determined as described herein with reference to various embodiments. For $h_k \neq h_j$, the hash values of $\Psi_1$ and $\Psi_2$ need to be independent, even on correlated inputs. Further, a function $\phi: u_{ij} \mapsto k$ can be defined to map an attribute to its equivalence class index k (i.e., map to a value k so that $\psi(u_{ij})=\Psi_k$).

For $U_i$ denoting the set of all join attributes for table $T_i$, $|U_i|$ denotes the size of this set (i.e., the number of join attributes in table $T_i$). For a join attribute $u_{ij} \in U_i$ taking the value $v_{ij}$, the inclusion condition for $u_{ij}$ can be defined as:

$$h_{\phi(u_{ij})}(v_{ij}) < (p_i)^{\frac{1}{|U_i|}}$$

Accordingly, a given row r is included in the sample $S_i$ if the inclusion condition is satisfied for all join attributes $u_{ij}$ in that row. For a truly random hash function, the probability that each one of the inclusion conditions for that row is satisfied is $$(p_i)^{\frac{1}{|U_i|}}.$$

Since the chosen hash functions generate independent uniform random variables (regardless of correlations among the inputs), the event that any given attribute in row r satisfies its inclusion condition is independent of all the other attributes satisfying the inclusion condition. That is:

$$P\left(h_{\phi(u_{i1})}(v_{i1}) < (p_i)^{\frac{1}{|U_i|}} \bigwedge \cdots \bigwedge h_{\phi(u_{i|U_i|})}(v_{i|U_i|}) < (p_i)^{\frac{1}{|U_i|}}\right) =$$

$$P\left(h_{\phi(u_{i1})}(v_{i1}) < (p_i)^{\frac{1}{|U_i|}}\right) \cdots P\left(h_{\phi(u_{i|U_i|})}(v_{i|U_i|}) < (p_i)^{\frac{1}{|U_i|}}\right) =$$

$$\left((p_i)^{\frac{1}{|U_i|}}\right)^{|U_i|} = p_i$$

Thus, correlations among the attributes of each table may be ignored when performing sampling and when determining the sampling probability $p_i$.

In one embodiment, for a complex join query that includes equijoin conditions for tables $T_1, \ldots, T_N$, a particular row $r_{out}$ from the output of that join may be broken into rows $r_1, \ldots, r_N$ from the individual tables that were joined in order to create that output row. Since the probability of a row $r_i$ being included into the sample $S_i$ is $p_i$, and each attribute appears in exactly one equivalence class, the probability that all rows $r_1, \ldots, r_N$ get included into the corresponding samples, denoted herein as $P_{inc}$, may be determined as:

$$P_{inc} = P\left(\bigwedge_{i=1}^{N} \bigwedge_{j=1}^{|U_i|} h_{\phi(u_{ij})}(v_{ij}) < (p_i)^{\frac{1}{|U_i|}}\right) = P\left(\bigwedge_{k=1}^{K} \bigwedge_{u_{ij} \in \Psi_k} h_{\phi(u_{ij})}(v_{ij}) < (p_i)^{\frac{1}{|U_i|}}\right)$$

This is also the probability that the row $r_{out}$ appears in the output of the join.

Further, $\phi(u_{ij})=k$ is known for every attribute $u_{ij} \in \Psi_k$ and $v_{ij}=v_{kl}$ since any two attributes $u_{ij}$ and $u_{kl}$ in $\Psi_k$ satisfy the join condition $u_{ij}=u_{kl}$. Accordingly, a single attribute value $\alpha_k$ may be defined for the attributes in $\Psi_k$ so that $v_{ij}=\alpha_k$ for any attribute $u_{ij} \in \Psi_k$. Therefore, since $$h_k(\alpha_k) < (p_i)^{\frac{1}{|U_i|}}$$

if and only if this is true for the smallest value of $$(p_i)^{\frac{1}{|U_i|}},$$

the inclusion probability $P_{inc}$ can be written as $$P_{inc} = P\left(\bigwedge_{k=1}^{K} \bigwedge_{u_{ij} \in \Psi_k} h_{\phi(u_{ij})}(v_{ij}) < (p_i)^{\frac{1}{|U_i|}}\right) =$$

$$P\left(\bigwedge_{k=1}^{K} \bigwedge_{u_{ij} \in \Psi_k} h_k(\alpha_k) < (p_i)^{\frac{1}{|U_i|}}\right) = P\left(\bigwedge_{k=1}^{K} h_k(\alpha_k) < \min_{i \in \Psi_k}\left((p_i)^{\frac{1}{|U_i|}}\right)\right)$$

where $$\min_{i \in \Psi_k}$$

denotes a minimum taken over all tables that appear in the equivalence class k.

Additionally, the hash functions $h_k$ produce independent uniform random variables, therefore:

$$P_{inc} = P\left(\bigwedge_{k=1}^{K} h_k(\alpha_k) < \min_{i \in \Psi_k}\left((p_i)^{\frac{1}{|U_i|}}\right)\right) =$$

$$\prod_{k=1}^{K} P\left(h_k(\alpha_k) < \min_{i \in \Psi_k}\left((p_i)^{\frac{1}{|U_i|}}\right)\right) = \prod_{k=1}^{K} \min_{i \in \Psi_k}\left((p_i)^{\frac{1}{|U_i|}}\right)$$

which may be readily computed and is the same for all rows that appear in the output of the join. Accordingly, in one embodiment, the cardinality of the join may be estimated by computing the join size over samples $S_1, \ldots, S_N$ and dividing it by the inclusion probability $P_{inc}$ as provided above. The true join size can be expressed as $J = \sum_{\vec{v}} F(\vec{v})$ where $\vec{v}$ denotes the vector of join attributes that define a particular row in the output of the join and $F(\vec{v})$ denotes the number of rows in the output of the join that have a combination of join attributes specified by $\vec{v}$.

Further, with $I(\vec{v})$ denoting an indicator variable that is equal to 1 if and only if the row with attributes specified by $\vec{v}$ is included into the join output, and with J' denoting the join size of the samples, it holds that:

$$E[J'] = E\left[\sum_{\vec{v}} F(\vec{v}) I(\vec{v})\right] = \sum_{\vec{v}} E[I(v)] F(\vec{v}) = P_{inc} \sum_{\vec{v}} F(\vec{v}) = P_{inc} \cdot J$$

Therefore, $J = E[J']/P_{inc}$, that is, the estimation procedure in this embodiment is unbiased. Similarly, for the variance of the estimator, noting that $I(\vec{v}_1)$ and $I(\vec{v}_2)$ are independent for $\vec{v}_1 \neq \vec{v}_2$, it holds that:

$$\mathrm{Var}[J'] = \sum_{\vec{v}} \mathrm{Var}[I(\vec{v})] F^2(\vec{v}) = P_{inc}(1 - P_{inc}) \sum_{\vec{v}} F^2(\vec{v})$$

Since the final estimate of the loin size is $\hat{J} = J'/P_{inc}$, the variance of the estimate is:

$$\mathrm{Var}(\hat{J}) = \left(\frac{1}{P_{inc}} - 1\right) \sum_{\vec{v}} F^2(\vec{v})$$

For embodiments where a predicate filter condition $c_i$ is used for table $T_i$, the same variance formulation applies but with $F_i(v)$ replaced with $F_i^{c_i}(v)$.

In one embodiment, the sampling probabilities are determined to provide error guarantees for the estimates obtained by correlated sampling. In one embodiment, given a sampling probability for any one table in the join graph, the optimal sampling probability is determined for all other tables, provided that information about the join graph is available before sampling is performed. For example, assuming that the sampling probability $p_1$ of table $T_1$ is given, and tables $T_1$ and $T_2$ both appear in the same equivalence class $\Psi$, if $$p_1^{\frac{1}{|U_1|}} > p_2^{\frac{1}{|U_2|}},$$

the multiplicative factor in $P_{inc}$ due to $\Psi$ is at most $$p_2^{\frac{1}{|U_2|}}.$$

In other words, a smaller sampling probability $p_1$ may be used while still obtaining the same accuracy. A similar argument can be applied to the case of $$p_1^{\frac{1}{|U_1|}} < p_2^{\frac{1}{|U_2|}},$$

therefore the most efficient sampling probability (i.e., the sampling probability that does not "waste" any of the resulting sample) occurs when $$p_2 = p_1^{\frac{|U_2|}{|U_1|}}.$$

This also holds for any other sampling probability $p_i$ where $i \in \Psi$. As such, one embodiment provides a method for determining the sampling probability for all tables in a join graph where every table is connected to another via some join condition (i.e., an equivalence class). In this embodiment, starting with the sampling probability for a single table in the join graph, the graph is traversed by determining the sampling probabilities for all the tables in the join graph using a single parameter.

One embodiment implements the correlated sampling algorithm for two tables (or streams) A and B, and a join attribute X, where A and B need to satisfy an equijoin condition graph. In this embodiment, for each equivalence class in the join condition graph, a hash function is constructed in the same manner as described herein with reference to various embodiments. Then, each table (or stream) that appears in the join condition graph is scanned. Let $u_1$, $u_2, \ldots, u_n$ denote the join attributes present in each row of that table, $f(u_k)$ denote the index of the equivalence class to which the join attribute $u_k$ belongs, and $h_{\{f(u_k)\}}(\ )$ denote a hash function mapping the range of the attribute $u_k$ into the interval [0,1). For each row in this table, let $v_1, v_2, \ldots, v_n$ be the values taken by the join attributes $u_1, u_2, \ldots, u_n$. This row is included in the correlated sample for this table if $h_{\{f(u_k)\}}(v_n) < (p_i)^{(1/n)}$ for all k=1, 2, ..., n, where $p_i$ is the sampling probability for table i. Then, using the conditions in the join graph, the size of the join of the samples, J', is computed, and the final estimate J of tables A and B is determined as $J = J'/p_{inc}$, where $p_{inc}$ is the product, over all equivalence classes, of the minimum value of $(p_i)^{(1/|u_i|)}$ taken over all tables i that appear in the considered equivalence class (with $|u_i|$ being the number of join attributes present in table i). In one embodiment, the best join size estimates are obtained for a given memory budget for all samples if the sampling probabilities satisfy $(p_i)^{(1/|u_i|)} = (p_j)^{(1/|u_j|)}$ for any two tables i and j in the join graph.

In one embodiment, the correlated sampling algorithm can be used in the query optimizer of any commercial database product. For example, when a query optimizer attempts to determine the best execution plan with the lowest cost among all considered candidate plans, the correlated sampling algorithm can be used to provide join size estimates for cost computation of query execution, such as required I/O, CPU, and communication resources. The correlated sampling algorithm can provide precise estimates when join attribute values repeat infrequently in at least one of the tables, which is a very common scenario in databases from Oracle Corp. This may happen, for example, when joining a customer table with other tables (e.g., sales or time tables) with the join attribute value being a unique customer ID.

In one embodiment, the correlated sampling algorithm can be used for estimating the join size of data streams. Accurate join size estimation is also useful for monitoring/tracking wireless sensor networks such as ad hoc environmental monitoring sensor networks or ad hoc inventory tracking sensor networks or in the operation and maintenance of large scale event monitoring applications at the IP backbone of ISPs, since such large scale event monitoring requires effective tracking queries that combine and/or correlate information (e.g., IP traffic or sensor measurements) observed across a collection of remote sites. In one embodiment, tracking the result size of a join (referred to as the "workhorse" correlation operator in the relational world) over the streams of fault/alarm data from two or more IP routers (with a join condition based on, e.g., their observed timestamp values) can allow network administrators to effectively detect correlated fault events at the routers and possibly pinpoint the root-causes of specific faults in real time. Examples of data streams to which join size estimation can be applied are usage information in ISPs (e.g., call records, packet flow data, etc.), retail chain transactions, banking transactions via automated teller machines ("ATMs") and credit cards, stock tickers, Web server log records, etc.

FIG. 2 is a flow diagram of database management module 16 of FIG. 1 when performing database management in accordance with embodiments of the present invention. In one embodiment, the functionality of the flow diagram of FIG. 2 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 202 database management module 16 receives a request for a query of a plurality of tables in database 17 under a join condition on an attribute. In one embodiment, the join condition is an equijoin condition.

At 204 database management module 16 determines a uniform mapping that maps a domain of the attribute into a set of numbers, wherein the domain of the attribute includes all attribute values taken by the attribute in the plurality of tables.

At 206, for a row in a table of the plurality of tables, database management module 16 includes the row into a synopsis of the table if the row includes an attribute value that is mapped by the uniform mapping to a number less than an inclusion probability associated with the table. In one embodiment, the number is generated using a uniform random value generator with a seed set to the attribute value. In one embodiment, the number is generated by determining a hash function that uniformly maps the domain of the attribute into [0,1) and providing the attribute value as an input to the hash function. In one embodiment, the hash function is randomly chosen from a strongly universal family of hash functions that map the domain of the attribute type into [0,1). In one embodiment, the inclusion probability is equal to a desired size of the synopsis divided by a size of the table.

At 208 database management module 16 obtains a plurality of synopsis for the plurality of tables by repeating the including for all rows in the table and for all tables in the plurality of tables.

At 210 database management module 16 determines, based on the plurality of synopsis, an estimate join size of the plurality of tables under the join condition. In one embodiment, the estimate join size is determined by determining a join size of the plurality of synopsis under the equijoin condition and dividing the join size by a minimum of inclusion probabilities associated with the plurality of tables. In one embodiment, the join condition is specified after the plurality of synopsis is obtained.

In one embodiment, database management module 16 further estimates frequencies of occurrence of attribute values in the plurality of tables, determines a subset of attribute values that occur in the plurality of tables with a frequency higher than a threshold, and determines a contribution of the subset of attributes in the estimate join size based on the estimated frequencies.

As disclosed, embodiments allow for building a compact synopsis of a database table or a data stream using one-pass correlated sampling. In one embodiment, the synopsis of a table is constructed by randomly selecting a subset of the rows of the table for inclusion in the synopsis, and random variables that are used to make inclusion decisions are shared among the tables. The synopsis can then be used to provide an unbiased estimate of the join size of the table (or stream) subject to dynamically specified predicate filter conditions. The filter conditions can be specified over attributes other than the join attribute. Accordingly, embodiments give the end user the possibility of accurately estimating the cardinality of equality joins of very large tables for which only one-pass processing is feasible, subject to dynamically specified predicate filter conditions.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor, cause the processor to perform database management, the database management comprising:

receiving a request for a query of a plurality of tables under a join condition on an attribute;

determining a uniform mapping that maps a domain of the attribute into a set of numbers, wherein the domain of the attribute includes all attribute values taken by the attribute in the plurality of tables;

for a row in a table of the plurality of tables, including the row into a synopsis of the table if the row includes an attribute value that is mapped by the uniform mapping to a number less than an inclusion probability associated with the table, wherein the number is generated using a uniform random value generator with a seed set to the attribute value;

generating a plurality of synopsis, each of the plurality of synopsis corresponding to one of the plurality of tables, by repeating the including for all rows in the table and for all tables in the plurality of tables;

after generating the plurality of synopsis, receiving dynamically specified filter conditions specified over multiple columns of each table;

determining, based on the plurality of synopsis and the dynamically specified filter conditions, an estimate join size of the plurality of tables under the join condition, wherein the determining is based on a single pass over all rows for each of the tables and the estimate join size comprises a computer resource requirement for executing the query; and determining whether to execute the query based at least on the estimate join size.

2. The computer readable medium of claim 1, wherein the number is generated by:

determining a hash function that uniformly maps the domain of the attribute into [0,1); and providing the attribute value as an input to the hash function.

3. The computer readable medium of claim 1, wherein the inclusion probability is equal to a desired size of the synopsis divided by a size of the table.

4. The computer readable medium of claim 1, wherein the estimate join size is determined by:

determining a join size of the plurality of synopsis under the join condition; and dividing the join size by a minimum of inclusion probabilities associated with the plurality of tables.

5. The computer readable medium of claim 1, wherein the database management further comprises:

estimating frequencies of occurrence of attribute values in the plurality of tables;

determining a subset of attribute values that occur in the plurality of tables with a frequency higher than a threshold; and determining a contribution of the subset of attributes in the estimate join size based on the estimated frequencies.

6. The computer readable medium of claim 1, wherein the join condition is an equijoin condition.

7. The computer readable medium of claim 1, wherein the join condition is specified after the plurality of synopsis is obtained.

8. The computer readable medium of claim 1, wherein the determining the estimated join size comprises using a correlated sampling algorithm to find an estimate cardinality of an equality join of two tables under a single equijoin condition that a first attribute in a first table needs to be equal to a first attribute in a second table.

9. The computer readable medium of claim 2, wherein the hash function is randomly chosen from a strongly universal family of hash functions that map the domain of the attribute into [0,1).

10. A method of database management, comprising:

receiving a request for a query of a plurality of tables under a join condition on an attribute;

determining a uniform mapping that maps a domain of the attribute into a set of numbers, wherein the domain of the attribute includes all attribute values taken by the attribute in the plurality of tables;

for a row in a table of the plurality of tables, including the row into a synopsis of the table if the row includes an attribute value that is mapped by the uniform mapping to a number less than an inclusion probability associated with the table, wherein the number is generated using a uniform random value generator with a seed set to the attribute value;

generating a plurality of synopsis, each of the plurality of synopsis corresponding to one of the plurality of tables, by repeating the including for all rows in the table and for all tables in the plurality of tables;

after generating the plurality of synopsis, receiving dynamically specified filter conditions specified over multiple columns of each table;

determining, based on the plurality of synopsis and the dynamically specified filter conditions, an estimate join size of the plurality of tables under the join condition, wherein the determining is based on a single pass over all rows for each of the tables and the estimate join size comprises a computer resource requirement for executing the query; and determining whether to execute the query based at least on the estimate join size.

11. The method of claim 10, wherein the number is generated by:

determining a hash function that uniformly maps the domain of the attribute into [0,1); and providing the attribute value as an input to the hash function.

12. The method of claim 10, wherein the inclusion probability is equal to a desired size of the synopsis divided by a size of the table.

13. The method of claim 10, wherein the estimate join size is determined by:

determining a join size of the plurality of synopsis under the join condition; and dividing the join size by a minimum of inclusion probabilities associated with the plurality of tables.

14. The method of claim 10, further comprising:

estimating frequencies of occurrence of attribute values in the plurality of tables;

determining a subset of attribute values that occur in the plurality of tables with a frequency higher than a threshold; and determining a contribution of the subset of attributes in the estimate join size based on the estimated frequencies.

15. The method of claim 10, wherein the join condition is an equijoin condition.

16. The method of claim 10, wherein the join condition is specified after the plurality of synopsis is obtained.

17. The method of claim 11, wherein the hash function is randomly chosen from a strongly universal family of hash functions that map the domain of the attribute into [0,1).

18. A system for database management, comprising:

a processor coupled to a storage device that stores instructions, wherein the process executes the instructions and implements modules comprising:

a receiving module that receives a request for a query of a plurality of tables under a join condition on an attribute;

a determining module that determines a uniform mapping that maps a domain of the attribute into a set of numbers, wherein the domain of the attribute includes all attribute values taken by the attribute in the plurality of tables;

an including module that, for a row in a table of the plurality of tables, includes the row into a synopsis of the table if the row includes an attribute value that is mapped by the uniform mapping to a number less than an inclusion probability associated with the table, wherein the number is generated using a uniform random value generator with a seed set to the attribute value;

an obtaining module that generates a plurality of synopsis, each of the plurality of synopsis corresponding to one of the plurality of tables, by repeating the including for all rows in the table and for all tables in the plurality of tables and after generating the plurality of synopsis, receiving dynamically specified filter conditions specified over multiple columns of each table; and an estimating module that determines, based on the plurality of synopsis and the dynamically specified filter conditions, an estimate join size of the plurality of tables under the join condition, wherein the determining is based on a single pass over all rows for each of the tables and the estimate join size comprises a computer resource requirement for executing the query and determining whether to execute the query based at least on the estimate join size.

19. The system of claim 18, wherein the number is generated by:
   determining a hash function that uniformly maps the domain of the attribute into [0,1); and
   providing the attribute value as an input to the hash function.

20. The system of claim 18, wherein the estimating module further:
   estimates frequencies of occurrence of attribute values in the plurality of tables;
   determines a subset of attribute values that occur in the plurality of tables with a frequency higher than a threshold; and
   determines a contribution of the subset of attributes in the estimate join size based on the estimated frequencies.

\* \* \* \* \*